(12) United States Patent
Heitner et al.

(10) Patent No.: US 6,696,917 B1
(45) Date of Patent: Feb. 24, 2004

(54) FOLDED CLOS ARCHITECTURE SWITCHING

(75) Inventors: Michael L. Heitner, Nepean (CA); Jian J. Song, San Jose, CA (US); Rudy Vianna, Hull (CA)

(73) Assignee: Nortel Networks Limited, St. Laurent (CA)

( * ) Notice: Subject to any disclaimer, the term of this patent is extended or adjusted under 35 U.S.C. 154(b) by 436 days.

(21) Appl. No.: 09/666,299

(22) Filed: Sep. 21, 2000

(51) Int. Cl.[7] .............................................. H03K 17/00
(52) U.S. Cl. .................. 340/2.22; 340/14.2; 340/2.21; 340/2.28; 340/2.25
(58) Field of Search ................. 340/14.2, 2.21, 340/2.28, 2.25, 2.23, 2.22; 385/17, 16, 24; 379/271, 291, 292

(56) References Cited

U.S. PATENT DOCUMENTS 4,821,034 A * 4/1989 Anderson et al. ........ 340/825.8
6,335,992 B1 * 1/2002 Bala et al. ................. 385/17

OTHER PUBLICATIONS

F.K. Hwang, "Three–Stage Multiconnection Networks Which Are Nonblocking in the Wide Sense", The Bell System Technical Journal, pp 2183–2187, 1979.

Riccardo Melen et al., "Nonblocking Networks for Fast Packet Switching", IEEE, pp. 548–557, 1989.

Charles Clos, "A Study of Non–Blocking Switching Netoworks", The Bell System Technical Journal, pp. 406–414.

* cited by examiner

Primary Examiner—Michael Horabik
Assistant Examiner—Vernal Brown

(57) ABSTRACT

A novel folded Clos switch apparatus and method therefore for reducing the number of unemployed I/O terminals of a multistage Clos switching network by partitioning a crossbar switch to provide both the first (yth) and last (x−y+1th) stage of a multistage Clos switch where x is the total number of stages in the general case.

6 Claims, 5 Drawing Sheets

FOLDED CLOS ARCHITECTURE SWITCHING

FIELD OF THE INVENTION

This invention pertains to non-blocking switching networks, and more particularly, to Clos switch architectures.

BACKGROUND OF THE INVENTION

Modern high-capacity communication channels have alleviated a number of communication bottlenecks, namely limitations in data transfer rate and channel bandwidth. However, the recent increase in channel bandwidth has also given rise to the need for switching networks capable of maintaining not only high data rates, but also large numbers of separate I/O channels.

Historically, the driving force behind the development of switching networks has been the need to provide a non-blocking telephone switching architecture capable of connecting any pair of user terminals under arbitrary traffic conditions. Early on, it was recognized that a crossbar switch with n input terminals, n output terminals and $n^2$ crosspoints as shown in FIG. 1 is capable of providing the required non-blocking performance, only at a prohibitive cost in large systems. For a square crossbar switch, the number of crosspoints grows by $n^2$, making the crossbar switch too complex to implement for a large number of inputs.

In a seminal paper entitled "A Study of Non-blocking Switching Networks," Bell Syst. Tech. J., vol. 32, 3/53, pp. 406–424, published in 1953, Charles Clos proposed a scheme to partition the large crossbar into a number of stages, thus reducing the complexity of the network by decreasing the number of crosspoints.

FIG. 2 shows a square three-stage Clos switch architecture. The first (input) stage includes N/n crossbar switches, each having n inlets and k outlets. The second (center) stage consists of k crossbar switches of size (N/n)×(N/n). Similar to the first stage, the third (output) stage also consists of N/n crossbar switches. However, each individual crossbar switch of the third stage has k inlets and n outlets.

According to Clos' space-division technique, there are k possible paths for an inlet to reach an outlet. The worst case scenario occurs when for a given inlet and outlet, (n−1) inlets of the first stage are used by other sources, and (n−1) other sources use (n−1) outlets of the third stage. As a result, a minimum of (n−1)+(n−1)+1 routes must be available between the inlet and the outlet. The three stage switch is therefore non-blocking if k≦(n−1)+(n−1)+1, or simply k≦(2n−1).

In contrast to the crossbar switch of FIG. 1, the three stage Clos switch configuration has nk(N/n) crosspoints for each first and last stages, and $k(N/n)^2$ crosspoints for the middle stage, for a total of $S=2kN+k(N/n)^2$ [Equation S] crosspoints. The optimum number of crosspoints can be obtained by substituting the total number of crosspoints into equation S and differentiating with respect to n then equating to zero. For large values of N, the optimum value of crosspoints is $n_{opt} \approx (N/2)^{1/2}$, a definite improvement over the single stage crossbar matrix. Nonetheless, the use of generic square crossbar switches to build a multistage switch results in waste of I/O ports at the input and output stages of the Clos switch. Although rectangular (asymmetrical) crossbar switches can be used in each switching stage of a multistage crossbar switch to reduce the number of idle I/O ports, rectangular crossbar switches are application-specific and unlike their generic square counterparts, cannot be readily used in a wide variety of applications.

Switch complexity can be somewhat ameliorated by rearranging an existing connection through a different set of switching interconnections by means of control systems. However, rearrangeable switching networks require data synchronization and employ complex control systems for managing and rerouting large numbers of existing connections. This need for synchronizing the incoming data often requires an additional processing layer at the input and output stages. Furthermore, even though a rearrangeable switch may provide non-blocking behavior, a connection may still suffer from unacceptable performance in terms of delay and data loss if the wrong path is chosen by the control system.

There is therefore a need for a non-blocking switching network that fully utilizes the input and output terminals at various stages of the switching architecture. Preferably, such a system can be implemented using off-the-shelf square crossbar switches having a fixed number of I/O terminals, such that the need for using custom-made rectangular crossbars is avoided.

SUMMARY OF THE INVENTION

The above problems and other similar shortcomings of the existing systems are solved by partitioning a crossbar switch to provide both the first (yth) and last (x−y+1th) stage of a multistage Clos switch architecture where x is the total number of stages in the general case. By aggregating each input stage having n inlets and its corresponding output stage also having n outlets into a single device, a non-blocking crossbar building block of (3n−1)×(3n−1) dimensions is obtained, thereby reducing the number of unused I/O terminals or the need for asymmetrical custom-made switching devices. In the general case of an output stage having a different number of outlets m than the first stage number of inlets n, we encounter the following two cases, as the dilation of the middle stages becomes a function of the greater of n and m:

a) if n≧m, then the non-blocking crossbar building block is of size (3n−1)×(2n+m−1);

b) if n<m, then the non-blocking crossbar building block is of size (2m+n−1)×(3m−1).

This invention arises from the realization that the use of conventional square crossbar devices to build multistage Clos switches results in waste of input and output terminals on all stages except the middle stage, making the cost penalties for implementing large switching systems prohibitive. The architectural complexity and loss of I/O terminals can be obviated by means of a novel method for combining the input and output stages of thp Clos switch network into a single device, thus allowing for an advantageous grouping of functional elements of the Clos switch architecture that minimizes the number of inactive inputs and outputs without loss of non-blocking behavior. The invention departs from a mere replacement of prior art elements with larger size switching devices, and instead focuses on grouping of the input and output stages of a Clos switching architecture into a single device in order to significantly reduce size, complexity and cost of integrated switching networks. Additionally, another benefit of aggregating the first and last stages in the same device is that loopbacks come in for free, be it directly form the switch to I/O port side or from the middle stages.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

Figure 1:
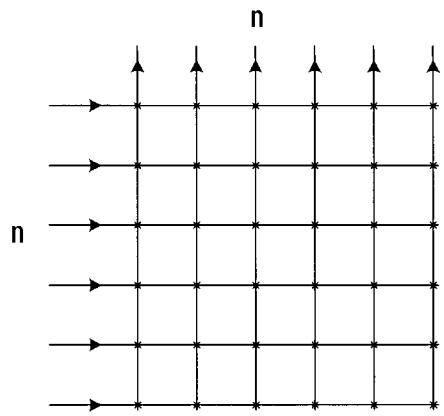
FIG. 1 is a representation of a non-blocking n×n square crossbar matrix.
Figure 2:
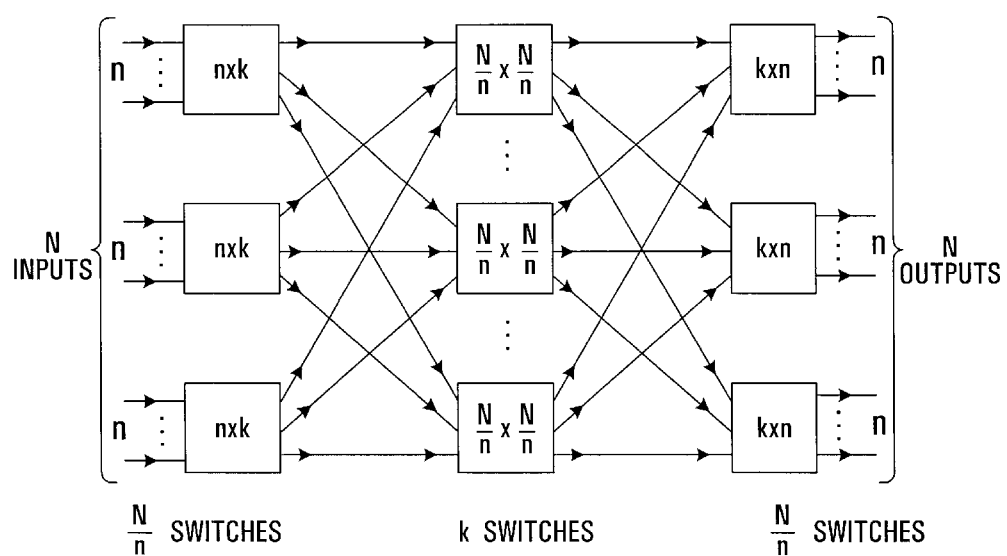
FIG. 2 is a schematic diagram of an exemplary three stage Clos switch architecture.
Figure 3:
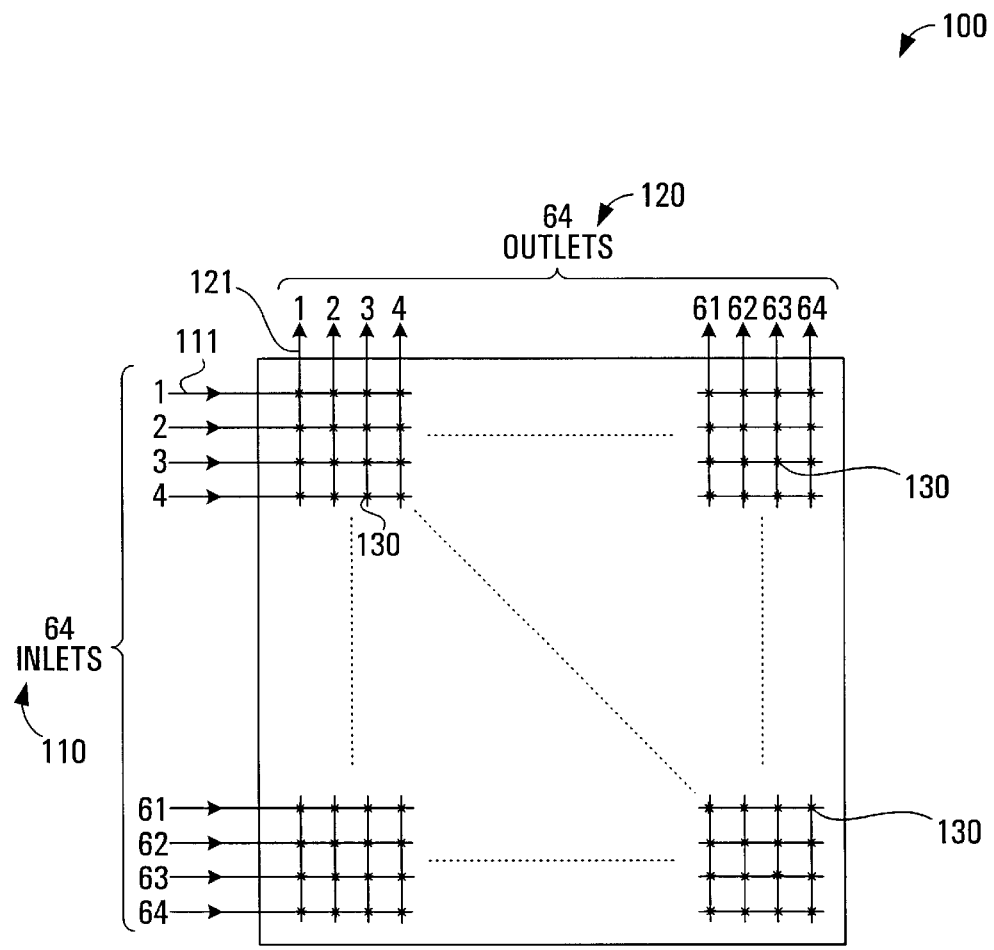
FIG. 3 is a representation of a 64×64 crossbar matrix.

A preferred embodiment of the present invention is hereafter described with reference to FIGS. 3 to 6. FIG. 3 shows a square crossbar switch 100 having a plurality of inlets 110 for accepting an incoming signals and outlets 120 for outputting a signal, wherein any one inlet 111 may be selectively connected to any one of outlets 121 by means of crosspoints 130. It should be noted that the inlets 110, outlets 120 and crosspoints 130 are nomenclature common to all crossbar switches hereafter referred to in the ensuing description, regardless of their shape or dimension.

The particular switching matrix of FIG. 3 has sixty-four inlets 110, sixty-four outlets 120, and a total number of four thousands ninety-six crosspoints 130 allowing an incoming signal (for example an electrical signal or an optical signal) from an inlet 111 to be routed to a particular outlet 121 without blocking. The crosspoints 130 may consist of optical or monolithic switching devices. For instance, a state-of-the-art monolithic IC equivalent of the switching matrix of FIG. 3 operates at speeds of up to 2.5 Gbps, for a total throughput of 160 Gbps.

Figure 4:
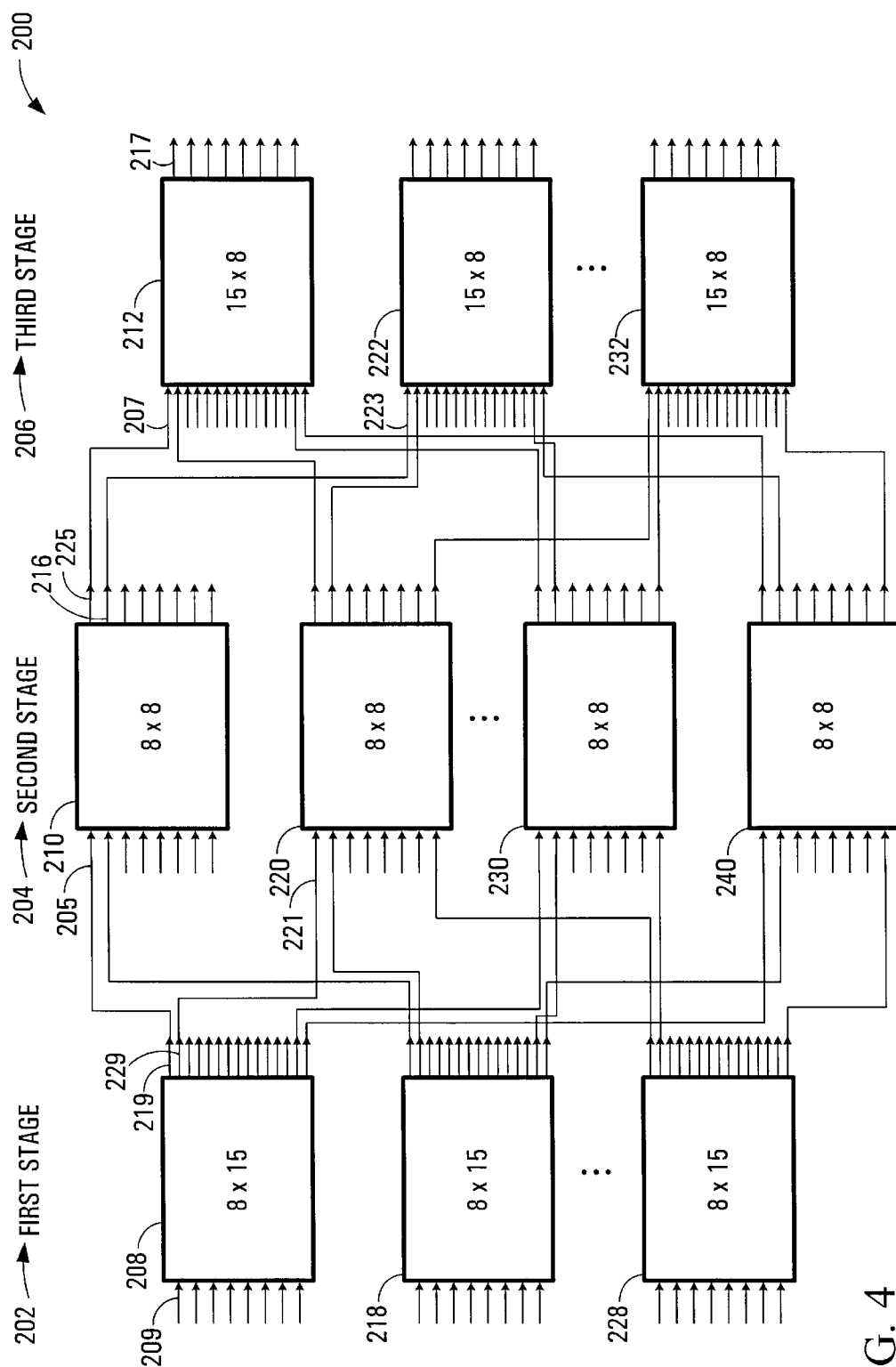
FIG. 4 is a representation of the three stage Clos switch architecture of FIG. 2 as applied to the crossbar matrix of FIG. 3.

FIG. 4 illustrates how the 64×64 crossbar switch of FIG. 3 may be implemented using a Clos switch architecture having fewer crosspoints per elements. The Clos switch architecture 200 includes a first stage 202 having eight 8×15 input crossbar switches three of which, 208, 218 and 228 are shown, a second stage 204 having fifteen 8×8 center crossbar switches four of which, 210, 220, 230 and 240 are shown, and a third stage 206 having eight 15×8 output crossbar switches three of which, 212, 222 and 232 are shown. The first outlet 219 belonging to first input crossbar switch 208 is connected to the first inlet 205 of the first center crossbar switch 210. The second outlet 229 of the first input crossbar switch 208 is connected to the first inlet 221 of the second center crossbar switch 220. In like fashion, the remaining outlets of the first stage 202 crossbar switches are sequentially connected to the corresponding inlets of the second stage 204 crossbar switches. In a similar fashion, the first outlet 215 of the first center crossbar switch 210 is connected to the first inlet 207 of the first output crossbar switch 212. The second outlet 216 of the first center crossbar switch 210 is connected to the first inlet 223 of the second output switch 222, and so on. As a result, non-blocking behavior is achieved as each inlet is sequentially interconnected to only one outlet.

Although the three stage Clos switch architecture 200 of FIG. 4 has more components, modest gains in cost and complexity are achieved as the three stage Clos switch architecture 200 uses components having fewer number of crosspoints than the single crossbar switch 100 of FIG. 3. Nonetheless, most off-the-shelf crossbar switches are square devices, and the use of square 16×16 crossbar switches to implement the first and third stage crossbar switches 202 and 206 results in waste of one hundred forty-four inlets and outlets, which translates into a total waste of 28% of I/O terminals per crossbar switch. As described in the following section, the present invention streamlines the Clos switching architecture by folding the first stage 202 and third stage 206 crossbar switches into single devices in order to reduce the number of unemployed I/O terminals.

Figure 5:
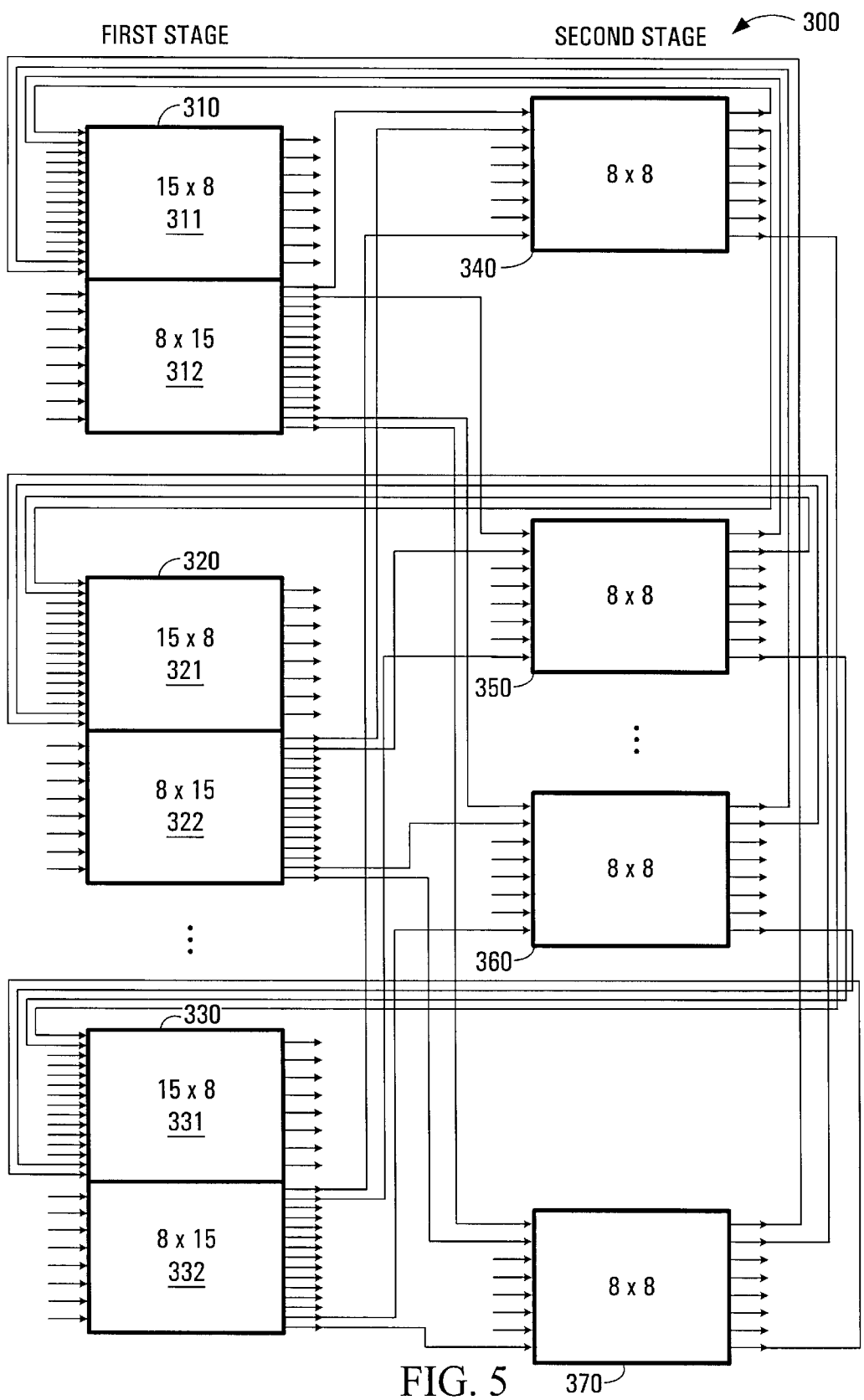
FIG. 5 is a schematic diagram of the connection arrangements for a folded Clos switch architecture of FIG. 3 in accordance with the present invention.

There is shown in FIG. 5 a preferred embodiment of a folded Clos switch architecture 300 for implementing the 64×64 crossbar matrix 100 of FIG. 3 in accordance with the teaching of the current invention. The folded Clos switch architecture 300 consists of eight first stage switches three of which, 310, 320 and 330 are shown, and fifteen second stage switches 340 four of which, 350, 360 and 370 are shown. The first stage switches are each sized 23×23 and the second stage switches are each sized 8×8. More particularly, the first stage crossbar switches 310, 320, 330 each have twenty-three inlets that are selectively connected to any twenty-three outlets by means of electrical or optical switching elements, in such a manner that any connection request between a particular set of inlets and outlets can be routed from its inlet to its targeted outlet without being blocked. Similarly, the second stage switches 340, 350, 360, 370 each consist of eight inlets selectively coupled to eight outlets via non-blocking optical or electrical switching devices.

Pursuant to the teaching of the invention, each first stage crossbar switch 310, 320, 330 is further partitioned into an input stage 311, 321, 331 and its corresponding output stage 312, 322, 332 relating to the input and output stages 202, 206 in the Clos switch architecture 200 of FIG. 4. In other words, the input 202 and output 206 stages of the conventional three stage Clos switch architecture 200 of FIG. 4 are folded together to constitute a single first stage crossbar device 310, 320, 330. For instance, the input stage crossbar switch 311 and its corresponding output stage crossbar switch 312 are combined together to form a first stage crossbar switch 310. Likewise, the input stage crossbar switch 321 and its corresponding output stage crossbar switch 322 are combined together to form a first stage crossbar switch 320. In similar fashion, successive input and output stage crossbar switches are aggregated together, so that the input stage crossbar switches 331 and its relating output stage crossbar switches 332 form the final first stage crossbar switch 330. As a result, instead of two separate crossbar switches of 8×15 and 15×8 for each input 311, 321, 331 and output 312, 322, 332 stages of the three stage Clos switch architecture, each crossbar switch pairs are each gathered together to form individual 23×23 crossbar switches, therefore significantly reducing the number of unused I/O terminal per device.

The first stage crossbar switches 310, 320, 330 are identical to one another and are each sized to include twenty-three inlets and twenty-three outlets. It should however be noted that the implementation of this preferred embodiment is not necessarily limited to this particular size of square crossbar switch. To achieve high scaleability while reducing the prohibitive cost of manufacturing rectangular crossbar switches, it is more advantageous to employ square crossbar switches preferably sized in binary increments as such devices are readily available in the industry.

Figure 6:
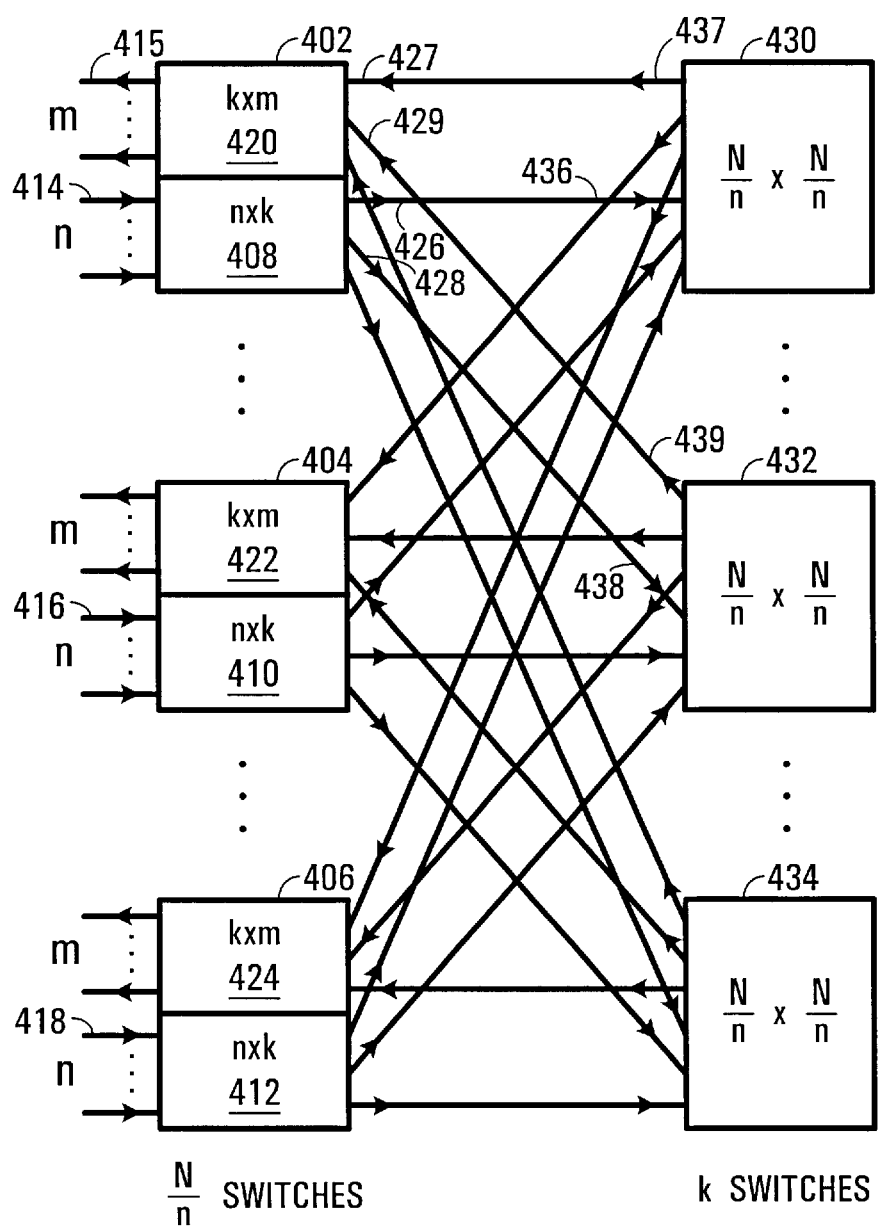
FIG. 6 is a schematic diagram of a generalized folded Clos architecture switch embodying the features of the current invention.

Reference is now made to FIG. 6 wherein a generalized three stage folded Clos architecture switch showing the features of the current invention is illustrated. There is shown in FIG. 6 a folded Clos switch architecture 400 having a total number of N input terminals and M output terminals, wherein M is at most equal to N. In a preferred embodiment of the invention, M is set equal to N in order to obtain a square Clos switch structure. The folded Clos switch 600 includes a plurality of first stage crossbar switches three of which, 402, 404 and 408 are shown. A given first stage crossbar switch 402 is partitioned into an input crossbar switch 408 comprising n inlets 414 for receiving an incoming signal and an output crossbar switch 420 having m outlets 415 selectively coupled to any of the n inlets for routing the incoming signal.

In order to achieve the overall switching function of connecting any particular inlet and outlet, each input 408 and output 420 crossbar switches also comprise at least K=m+n−1 outlets 426 and inlets 427 respectively such that an incoming signal can be successfully routed from any one of n inlets 414 to any one of m outlets 415 without blocking. In total, there are N/n first stage crossbar switches.

The folded Clos switch architecture 400 also includes K second stage crossbar switches three of which, 430, 432 and 434 are shown. Each second stage crossbar switch 430, 432, 434 is of size (N/n)×(N/n) wherein each inlet 436 is connected to its corresponding outlet 426 of the input stage crossbar switch 408. Similarly, the second inlet 438 is interconnected to the second outlet 428 of the input stage crossbar switch 408. In identical manner, successive outlets of the input stage crossbar switches are interconnected to their corresponding inlets of the second stage crossbar switches in an attempt to build the input part of the folded Clos switch architecture 400. In order to construct the output part of the folded Clos switch architecture 400, inlet 427 of the output crossbar switch 402 is connected to outlet 437 of the second stage crossbar switch 430. Inlet 429 of the output crossbar switch 402 is connected to outlet 437 of the second stage crossbar switch 432. In like fashion, successive inlets of the output crossbar switches are interconnected to their corresponding outlets of the second stage switches in a sequential manner as described above.

Considered together, the first and second stage crossbar switches fashion an interconnected three stage folded Clos switch architecture 400 that substantially reduces the number of wasted I/O terminals by combining two stages into a single device. Aggregating the input 408 and output 420 stages together yields first stage cross bar switches of size (3n−1)×(2n+m−1) for n≧m, (2m+n−1)×(3m−1) for n<m in the general case, and (3n−1)×(3n−1) in a square Clos switch implementation where m=n. This in turn translates into a significant economy in the total number of inlets and outlets of the state-of-the-art Clos switch structure.

Although the forgoing implementation is described with respect to a three stage Clos switch network, it should be noted that the teaching of the invention is not intended to be limited in scope only to three stage Clos switching structures. In fact, the folded Clos switch structure can also be realized by means of any stage-wise Clos switch structure having three or larger odd number of stages. Thus, in the general case of a square Clos switch architecture having x number of stages where x is an odd integer greater than or equal to three, the crossbar switch at a given yth input stage having a 2:2n−1 fan-out and its corresponding crossbar switch at the x−y+1th stage having 2n−1:n fan-in are physically united to create a single crossbar switch of size (3n−1)×(3n−1), partitioned into a (n)×(2n−1) and (2n−1)×(n) portions respectively.

What has been described is merely illustrative of the application of the principles of the invention. Other arrangements and methods can be implemented by those skilled in the art without departing from the spirit and scope of the present invention.

We claim:

1. A multistage Clos switching apparatus comprising: a plurality of crossbar switches connected in x stages where x is an odd integer equal to at least 3, the crossbar switches of a yth stage having n inlets and providing n:2n−1 fan-out and the crossbar switches of an x−y+1th stage providing 2n−1:n fan-in, where y is an odd integer between 0 and x and wherein the yth stage crossbar switches and the (x+1)th stage crossbar switches are physically combined and together comprise a plurality of (3n−1)×(3n−1) crossbar switches each being partitioned into a (n×(2n−1)) portion and a ((2n−1×n) portion.

2. A multistage Clos switching apparatus for selectively connecting any one of N input terminals to any one of M output terminals, the switching network comprising:

a plurality of first stage crossbar switches having (3n−1) inlets and (2n+m−1) outlets, each first stage crossbar switch arranged and partitioned into an input stage comprising n inlets and at least (2n−1) outlets, and an output stage comprising at least (n+m−1) inlets and m outlets; and a plurality of second stage crossbar switches each having (N/n) inlets and (N/n) outlets, each inlet connected to its corresponding outlet of the input stage and each outlet connected to its corresponding inlet of the output stage.

3. The non-blocking switching apparatus as set forth in claim 2, wherein the plurality of first stage crossbar switches are configured and arranged in (N/n) stages.

4. A multistage Clos switching apparatus for selectively connecting any one of N input terminals to any one of M output terminals, the switching network comprising:

a plurality of first stage crossbar switches having (2m+n−1) inlets and (3m−1) outlets, each first stage crossbar switch arranged and partitioned into an input stage comprising n inlets and at least (m+n−1) outlets, and an output stage comprising at least (2m−1) inlets and m outlets; and a plurality of second stage crossbar switches each having (N/n) inlets and (N/n) outlets, each inlet connected to its corresponding outlet of the input stage and each outlet connected to its corresponding inlet of the output stage.

5. A square multistage Clos switching apparatus for selectively connecting any one of N input terminals to any one of N output terminals, the switching network comprising:

a plurality of first stage crossbar switches having (3n−1) inlets and (3n−1) outlets, each first stage crossbar switch arranged and partitioned into an input stage comprising n inlets and at least (2n−1) outlets, and an output stage comprising at least (2n−1) inlets and m outlets; and a plurality of second stage crossbar switches each having (N/n) inlets and (N/n) outlets, each inlet connected to its corresponding outlet of the input stage and each outlet connected to its corresponding inlet of the output stage.

6. A method of aggregating a multistage Clos switching apparatus having an input nth stage, output x−n+1th stage and a middle stage therebetween where x is an odd integer representing the overall number of stages, each stage having a plurality of switches comprising inlets and outlets, the method comprising:

connecting each outlet of each input stage switch into the corresponding inlet terminal of each center stage switch;

connecting each outlet terminal of each center stage switch into the corresponding inlet terminal of each output stage switch;

aggregating each input stage and its corresponding output stage into a single switch device.

* * * * *